(12) United States Patent
Bouru

(10) Patent No.: US 7,393,178 B2
(45) Date of Patent: Jul. 1, 2008

(54) STATOR VANE STAGE ACTUATED BY A ROTARY ACTUATOR RING MOVED BY ELECTRIC MOTOR MEANS

(75) Inventor: Michel Andre Bouru, Montereau sur le Jard (FR)

(73) Assignee: SNECMA, Paris (FR)

( * ) Notice: Subject to any disclaimer, the term of this patent is extended or adjusted under 35 U.S.C. 154(b) by 197 days.

(21) Appl. No.: 11/296,315

(22) Filed: Dec. 8, 2005

(65) Prior Publication Data

US 2006/0133926 A1 Jun. 22, 2006

(30) Foreign Application Priority Data

Dec. 16, 2004 (FR) .................................. 04 13389

(51) Int. Cl.
*F04D 29/56* (2006.01)
(52) U.S. Cl. ...................................... 415/151; 415/160

(58) Field of Classification Search ................. 415/160, 415/151
See application file for complete search history.

(56) References Cited

U.S. PATENT DOCUMENTS

| 4,130,375 | A | | 12/1978 | Korta |
| 6,129,511 | A | * | 10/2000 | Salvage et al. ............... 415/150 |
| 7,004,723 | B2 | * | 2/2006 | Raulin et al. ................. 415/160 |
| 2004/0208742 | A1 | | 10/2004 | Raulin et al. |

FOREIGN PATENT DOCUMENTS

| EP | 0 527 593 A2 | 2/1993 |
| FR | 1 246 176 | 10/1960 |
| FR | 2 688 827 | 9/1993 |

* cited by examiner

*Primary Examiner*—Igor Kershteyn
(74) *Attorney, Agent, or Firm*—Oblon, Spivak, McClelland, Maier & Neustadt, P.C.

(57) ABSTRACT

A variable-pitch stator vane stage in which the vanes are moved by a rotary actuator ring driven by an electric motor. The outer actuator ring is connected by cranks to the vanes and is constrained to move in rotation only, centered on the axis of the turbomachine; the drive system includes two coaxial portions, an inner portion secured to the casing and an outer portion including the actuator ring, with an electrical drive unit being arranged between the two portions.

11 Claims, 3 Drawing Sheets

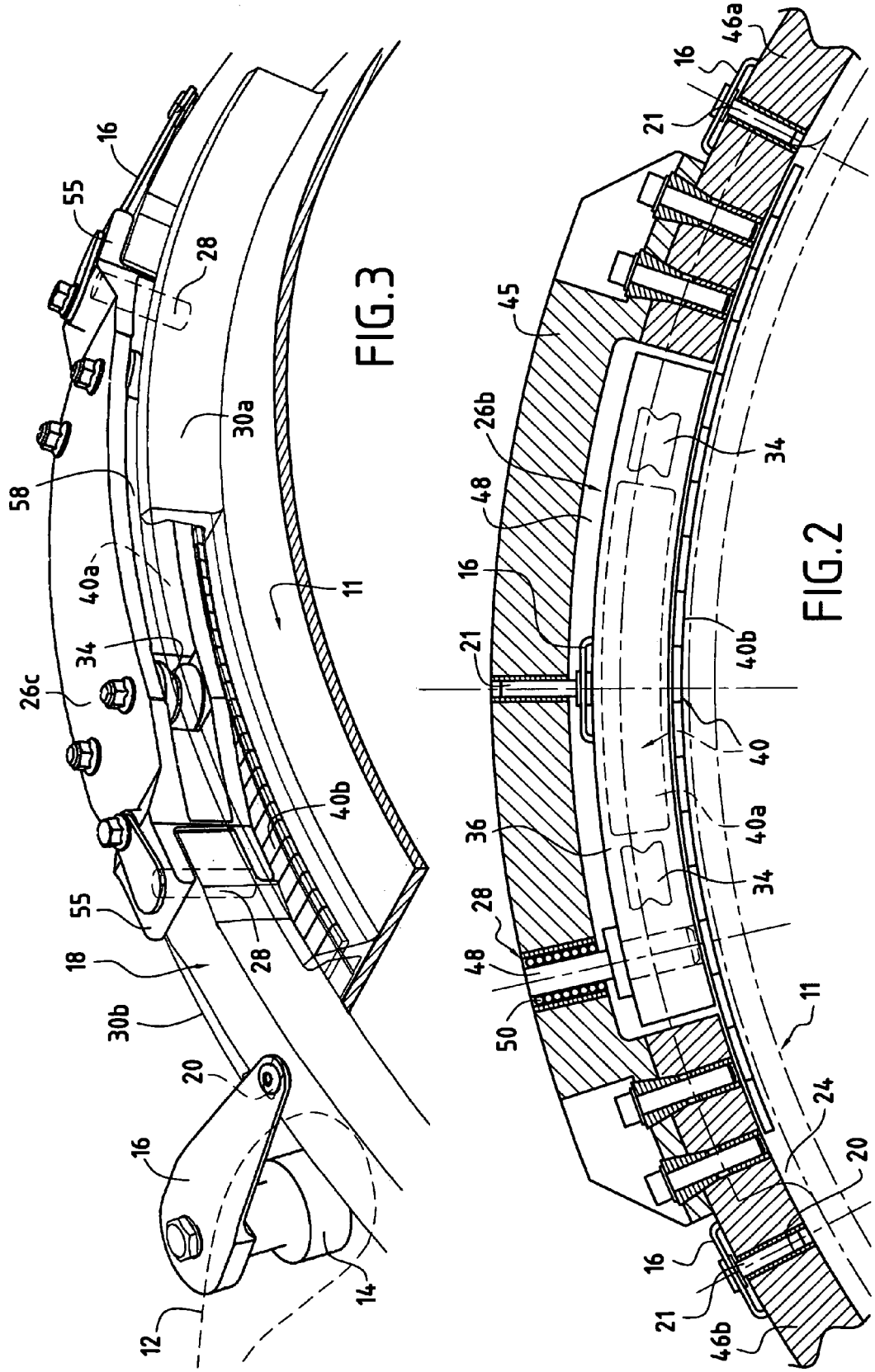

STATOR VANE STAGE ACTUATED BY A ROTARY ACTUATOR RING MOVED BY ELECTRIC MOTOR MEANS

The invention relates to a turbomachine having a stator that includes at least one variable-pitch stator vane stage arranged in a casing, said vanes being moved by a rotary actuator ring located outside the casing and carried thereby. The invention relates more particularly to electric drive for moving said actuator ring, in order to increase the accuracy and the speed of response of the vane-positioning control. The invention applies in particular to the field of airplane jet engines, and more particularly to a compressor in such an engine.

BACKGROUND OF THE INVENTION

In a turbomachine of the above-specified kind, a compressor stator is fitted with at least one stage of stator vanes that are variable in pitch, with the orientation of the vanes in the flow section being adjustable. Thus, the angle of attack of the vanes can be controlled as a function of operating conditions by a servo-control system that causes said actuator ring to move.

By way of example, U.S. Pat. No. 4,130,375 describes an actuator ring that moves circularly only, the ring being made up of two superposed rings. The inner ring constitutes a track ring mounted stationary on the casing by means of radially-extending studs, and the outer ring is the actuator ring proper, being attached via links to vane-actuation cranks, and running on the track ring via a system of wheels. Such a system is heavy and bulky, other things being equal.

In addition, the actuator ring is driven by one or more actuators. As a result the accuracy with which the vanes are positioned and the speed with which they are operated can be insufficient.

Furthermore, European patent No. 0 527 593 describes a linear electric motor structure adapted to driving an actuator ring. The system described makes use of electrical induction elements situated radially outside said actuator ring. The induction elements are bulky and difficult to integrate in the space available outside the casing. In addition, the actuator ring is not centered in satisfactory manner, particularly when considering possible variations in diameter (due to the temperature rise) between the actuator ring and the casing that supports it.

OBJECTS AND SUMMARY OF THE INVENTION

In a first aspect the invention seeks to provide electrical drive for an actuator ring that does not present the above-mentioned drawbacks.

More precisely, the invention provides a variable-pitch stator vane stage comprising vanes arranged in a casing, said vanes being moved by a drive system comprising an actuator ring outside said casing and carried thereby, with said actuator ring being connected to the vanes of said stage by cranks in order to actuate them simultaneously, wherein said actuator ring is constrained to move in rotation only, centered on the axis of said turbomachine, said drive system comprises two coaxial portions, an inner portion secured to the casing and an outer portion including said actuator ring that is connected to said cranks, and that is guided in rotation about said inner portion, and wherein at least one electrical drive unit is arranged between the two portions.

In a preferred embodiment, said inner portion comprises a stationary annular rail projecting from the outside surface of said casing, coaxially thereabout, and said outer portion comprises, in addition to said actuator ring, at least three moving equipments circumferentially spaced apart and constrained to move along said rail, each moving equipment being coupled to said actuator ring by a radial guide arrangement, and said drive unit being arranged between one of the moving equipments and said inner portion.

In one possible embodiment, said drive unit is a linear electric motor shared structurally between said inner and outer portions, in particular between the outside surface of the casing and at least one of the moving equipments.

In another possibility, the drive unit comprises a stepper electric motor and rack-and-pinion gear means are arranged between the motor shaft and one of the portions, with the body of said motor being carried by the other portion.

The above-defined structure occupies little radial space and is light in weight. In an advantageous embodiment, as specified above, the outer and inner portions are designed so that firstly the centering of the actuator ring relative to the axis of the turbomachine is always provided accurately regardless of the effects of temperature on the casing and on the actuator ring, and so that secondly said variations in temperature do not affect the coupling between the elements of said drive unit carried respectively by said inner and outer portions. If the electric motor is a so-called linear motor, it is essential for the spacing between the stator and the rotor of the motor to remain constant, which is indeed the case because one of them is carried by the outside wall of the turbomachine stator casing and the other is carried by the moving equipment that is constrained to move over the surface of the turbomachine stator following a path that is rigorously determined by the rail secured to said stator. This spacing remains the same regardless of temperature since the dimensional variations between the actuator ring and the casing are absorbed by said radial guide arrangement.

Furthermore, if the motor is of the stepper type installed on the casing or on the moving equipment, it is important for the pinion meshing with the rack always to remain at the same distance therefrom so as to conserve transmission accuracy and quality. This applies in the proposed system for the same reasons as those given above.

In a preferred embodiment, said outer portion has at least four moving equipments that are substantially equidistant circumferentially, and two similar drive units are arranged between said inner portion and two respective moving equipments that are substantially diametrically opposite.

The invention also provides a compressor provided with a stator vane stage as defined above, and also a turbomachine including at least one such stator.

BRIEF DESCRIPTION OF THE DRAWINGS

The invention can be better understood and other advantages thereof can be seen more clearly on reading the following description given purely as way of example and made with reference to the accompanying drawings, in which:

FIG. 2 is a detail view in section and on a larger scale showing a portion of the FIG. 1 actuator ring, fitted with a linear motor;

FIG. 3 is a perspective view of a portion of a variant actuator ring, fitted with a linear motor;

MORE DETAILED DESCRIPTION

Figure 1:
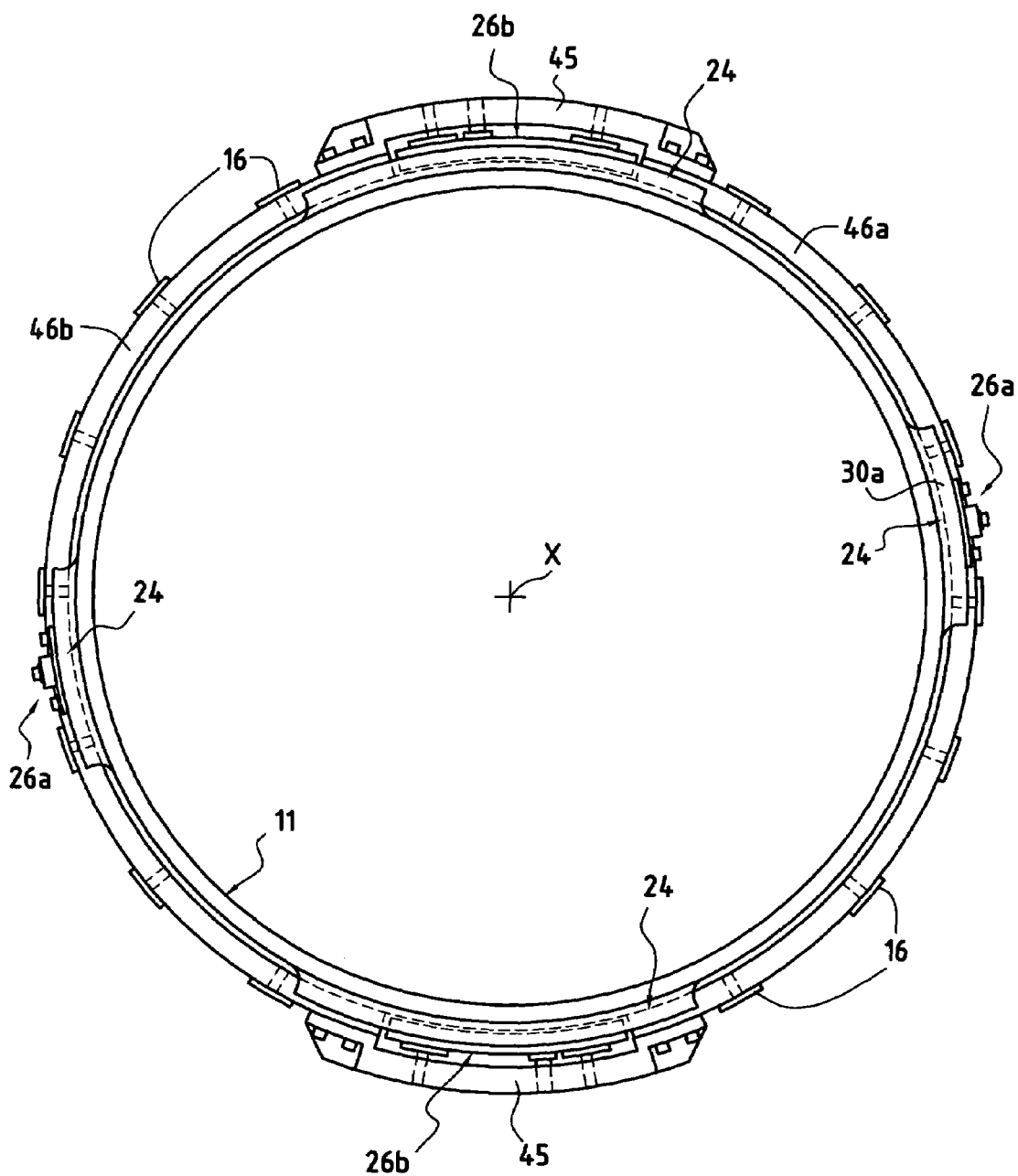
FIG. 1 is a section view of the casing perpendicularly to the axis of the turbomachine and showing how the actuator ring is mounted around said casing.

With reference more particularly to FIGS. 1 to 3, there can be seen the casing 11 of a turbomachine of axis X, housing variable-pitch stator vanes 12 (one of which is visible in FIG. 3). The vanes are not shown in FIG. 1. Each vane has a pivot 14 projecting from the casing and connected by a crank 16 to an actuator ring 18 outside the casing. Radial crank-drive holes 20 are formed through the actuator ring and tenons 21 secured to the ends of the cranks are engaged therein, with these holes being oblong since the movement of the actuator ring is circular only. It will be understood that turning the actuator ring circumferentially causes all of the vanes 12 to pivot simultaneously inside the casing and through the same angle. Thus, when the invention is applied to an airplane jet engine, the orientation of the vanes can be adjusted as a function of flying conditions.

On the outside, the casing 11 carries a stationary coaxial annular rail 24. In the example described, the rail is made integrally with the wall of the casing and projects from its outside surface. The rail is in fact segmented: only the useful segments thereof are provided. At least three circumferentially-spaced moving equipments 26a and 26b that are preferably substantially equidistant from one another, are constrained to move along the rail. Each moving equipment is coupled to the actuator ring by a radial guide arrangement 28 serving to provide accurate automatic centering of the actuator ring 18 relative to the axis X of the turbomachine. In the example described, there are four moving equipments 26a, 26b that are regularly spaced apart at 90° from one another, each carrying a radial guide arrangement 28.

In the presently-described example, the rail 24 is made up of two parallel track rings 30a, 30b secured to the casing, and the moving equipments 26a, 26b are shaped so as to move between the two track rings. The two (segmented) track rings 30a, 30b are provided with facing side rims, and the moving equipments carry V-groove wheels 34 in rolling engagement with the side rims. In addition, each moving equipment 26a or 26b includes a support 36 surrounding said actuator ring. The wheels 34 are mounted to rotate freely on said support.

In the example described, each moving equipment 26 has four V-groove wheels 34 co-operating in pairs with the two rims of the respective track rings 30a, 30b.

The system for driving the set of vanes mainly comprises two coaxially superposed portions. In the present description, the term "inner portion" is used to designate a set of elements secured to the casing, and in particular the rail 24, and the term "outer portion" is used to designate a set of elements capable of moving relative to said inner portion, and in particular said actuator ring 18 and said moving equipments 26a, 26b.

In accordance with the invention, an electrical drive unit 40 is arranged or distributed between the inner and outer portions. The term "electrical drive unit" is used to mean any actuator assembly capable of driving displacement by consuming electricity.

Advantageously, the or each drive unit is shared between a moving equipment 26 and said inner portion.

As shown, in particular in FIGS. 2 and 3, the drive unit 40 is a linear electric motor, structurally shared between said inner portion and the moving equipment belonging to said outer portion.

Thus, the linear motor is such that the distance between its moving portion 40a and its stationary portion 40b remains unchanging regardless in particular of variations in diameter between the actuator ring 18 and the casing 11 due to an increase in temperature. The torque delivered by the motor thus remains unchanging as does the accuracy of its displacement.

The linear motor thus comprises a "stator" (stationary portion 40b) carried by the casing, and disposed between the two parallel track rings of the rail over a certain length of the curved outside surface of the casing. It also comprises a "rotor" (moving portion 40a) carried by the moving equipment 26 and moving relative to the stator. The rotor and the stator are of constant and similar radii of curvature so that the facing surfaces are always spaced apart by a radial distance that is small and constant.

In the embodiment described, where the outer portion has four moving equipments that are substantially equidistant circumferentially, two similar drive units 40 are provided that are disposed between said inner portion and two respective substantially diametrically opposite moving equipments 26b. The two moving equipments 26b that carry linear motor elements are longer than the other two.

In the embodiment of FIGS. 1 and 2, for each drive unit 40, the actuator ring 18 has a connection bridge 45 in the form of a sector of increased radius of curvature. The bridge 45 is secured to two other segments 46a, 46b of the actuator ring by radial screws. Each bridge 45 is shaped so as to leave a space 48 housing the moving equipment 26b carrying a portion of the corresponding drive unit 40. The radial guide arrangement 28 corresponding to said moving equipment that carries a portion of the drive unit is itself mounted between said moving equipment 26b and the adjacent connection bridge 45. The guide arrangement is constituted by a rod 48 extending radially, secured to the moving equipment and engaged in a rolling bushing 50. The bushing extends in a radial hole through the connection bridge 45. The structure could be inverted (i.e. the bushing could be secured to the moving equipment and the rod could be secured to the bridge) without changing the radial guidance function.

The cranks 16 connected to the actuator ring are connected on the radially outer side thereof, with the exception of the cranks that are connected to the bridges 45, which are mounted to the radially inner side thereof. Thus, all of the cranks occupy a common cylindrical surface.

FIG. 3 shows a variant using a linear motor of the above-described type and in which the body of the moving equipment 26c forms an integral portion of the actuator ring 18 and is connected thereto by two of the above-described radial guide arrangements 28. More precisely, said body comprises a kind of fork 55 at each end in which there is mounted a radial rod slidable in an end bore adjacent to the drive ring segment. The moving equipment body also has elongate cavities 58 housing the rotor elements of the linear motor. In this variant, the radial extent of the actuator ring 18 is not increased by having the linear motor integrated therein.

Figure 4:
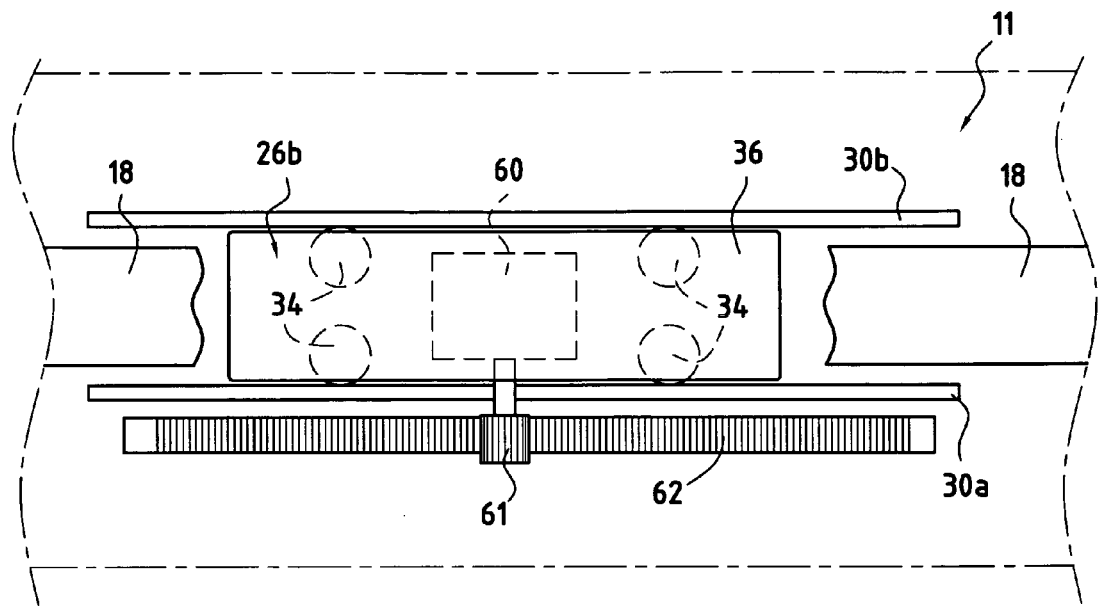
FIG. 4 is a diagrammatic view of an embodiment using a stepper motor.
Figure 5:
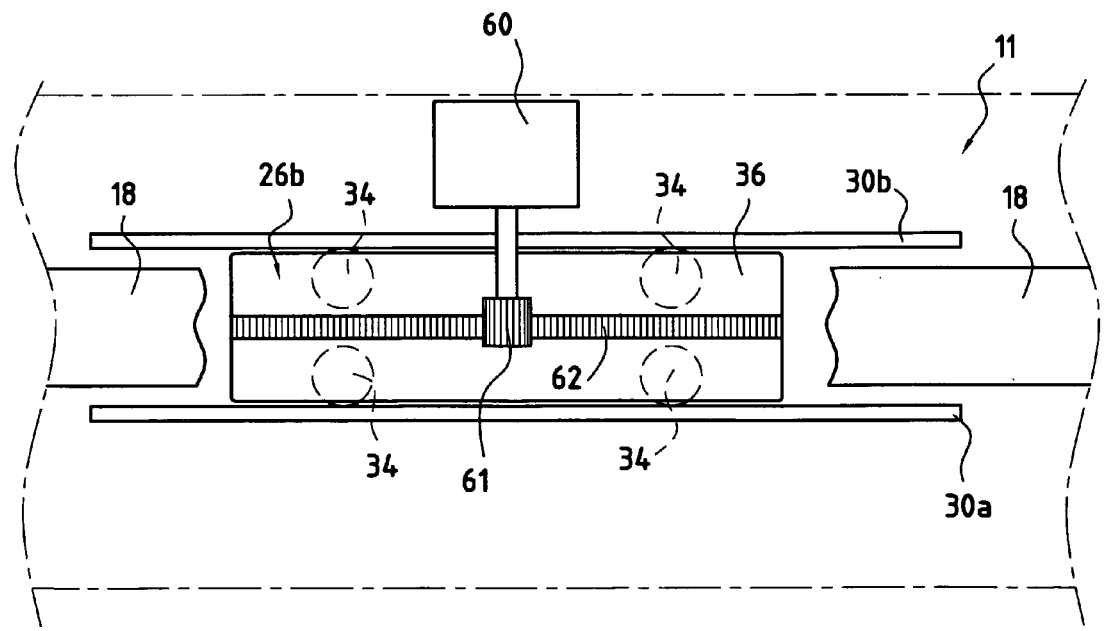
FIG. 5 is a diagrammatic view of another embodiment using a stepper motor.

In the variants shown diagrammatically in FIGS. 4 and 5, said drive unit comprises a stepper electric motor 60 and rack 62 and pinion 61 gear means arranged between the shaft of the motor and one of said inner or outer portions, with the body of the motor being carried by the other portion, respectively outer or inner. Thus, with reference to FIG. 4, the motor is carried by the moving equipment 26b, while the rack 62 is secured to the outside surface of the casing. In this non-limiting example, the motor shaft extends parallel to the axis X of the turbomachine, passing radially outside the rail and terminating in a pinion 61 that meshes with a curved rack 62 secured to the outside surface of the casing and parallel to the rail.

In contrast, the diagrammatic example of FIG. 5 shows the inverse structure in which the motor 60 is carried by the casing 11 while said rack 62 is carried by the moving equipment 26*b*.

What is claimed is:

1. A variable-pitch stator vane stage comprising vanes arranged in a casing, said vanes being moved by a drive system comprising an actuator ring outside said casing and carried thereby, with said actuator ring being connected to the vanes of said stage by cranks in order to actuate them simultaneously, wherein said actuator ring is constrained to move in rotation only, centered on the axis of said turbomachine, said drive system comprises two coaxial portions, an inner portion secured to the casing and an outer portion comprising said actuator ring that is connected to said cranks, and that is guided in rotation about said inner portion, and wherein at least one electrical drive unit is arranged between the two portions, wherein said outer portion and said actuator ring move together relative to said inner portion and said casing.

2. A variable-pitch stator vane stage arranged in a casing, said variable-pitch stator vane stage comprising vanes movable by a drive system comprising an actuator ring outside said casing and carried thereby, with said actuator ring being connected to the vanes of said stage by cranks in order to actuate them simultaneously, wherein said actuator ring is constrained to move in rotation only, centered on the axis of said turbomachine, said drive system comprises two coaxial portions, an inner portion secured to the casing and an outer portion including said actuator ring that is connected to said cranks, and that is guided in rotation about said inner portion, and wherein at least one electrical drive unit is arranged between the two coaxial portions, wherein said inner portion comprises a stationary annular rail projecting from the outside surface of said casing, coaxially thereabout, and said outer portion comprises, in addition to said actuator ring, at least three moving equipments circumferentially spaced apart and constrained to move along said rail, and wherein each moving equipment is coupled to said actuator ring by a radial guide arrangement, and said drive unit is arranged between one of the moving equipments and said inner portion.

3. A vane stage according to claim 2, wherein said drive unit is a linear electric motor that is shared structurally between said inner portion and said moving equipment.

4. A vane stage according to claim 2, wherein said drive unit comprises a stepper electric motor and rack-and-pinion gear means arranged between the shaft of the motor and one of said inner or outer portions, the body of said motor being carried by the respective other outer or inner portion.

5. A vane stage according to claim 4, wherein said motor is carried by the casing and wherein said rack is carried by said moving equipment.

6. A vane stage according to claim 4, wherein said motor is carried by said moving equipment and wherein said rack is secured to the outside surface of said casing.

7. A vane stage according to claim 2, wherein said outer portion comprises at least four moving equipments that are circumferentially spaced apart, and wherein two similar drive units are engaged between said inner portion and two respective substantially diametrically opposite moving equipments.

8. A vane stage according to claim 3, wherein, for each drive unit, said actuator ring includes a connection bridge in the form of a sector of increased radius of curvature, shaped to leave a space housing the moving equipment of said corresponding drive unit.

9. A vane stage according to claim 8, wherein said radial guide arrangement corresponding to said moving equipment of said drive unit is mounted between said moving equipment and the adjacent connection bridge.

10. A compressor provided with at least one variable-pitch stator vane stage according to claim 2.

11. A turbomachine including at least one compressor according to claim 10.

\* \* \* \* \*